US006722123B2

(12) United States Patent
Liu et al.

(10) Patent No.: US 6,722,123 B2
(45) Date of Patent: Apr. 20, 2004

(54) EXHAUST AFTERTREATMENT DEVICE, INCLUDING CHEMICAL MIXING AND ACOUSTIC EFFECTS

(75) Inventors: Z. Gerald Liu, Madison, WI (US); Michael T. Zuroski, Sun Prairie, WI (US); Cary D. Bremigan, Madison, WI (US); Kenneth J. Kicinski, Sun Prairie, WI (US); C. Raymond Cheng, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 46 days.

(21) Appl. No.: 10/083,952

(22) Filed: Feb. 27, 2002

(65) Prior Publication Data

US 2003/0079467 A1 May 1, 2003

Related U.S. Application Data

(63) Continuation-in-part of application No. 09/981,171, filed on Oct. 17, 2001.

(51) Int. Cl.[7] .................................................. F01N 3/00
(52) U.S. Cl. .............................. 60/286; 60/299; 60/303
(58) Field of Search ............................. 60/286, 303, 311, 60/299; 55/DIG. 30

(56) References Cited

U.S. PATENT DOCUMENTS

| 3,380,810 | A |   | 4/1968 | Hamblin |
|---|---|---|---|---|
| 3,645,093 | A |   | 2/1972 | Thomas |
| 3,754,398 | A |   | 8/1973 | Mattavi |
| 4,017,347 | A |   | 4/1977 | Cleveland |
| 4,054,418 | A |   | 10/1977 | Miller et al. |
| 4,538,413 | A |   | 9/1985 | Shinzawa et al. |
| 4,562,695 | A | * | 1/1986 | Rao et al. ................ 60/286 |
| 4,651,524 | A | * | 3/1987 | Brighton .................. 60/274 |
| 4,652,286 | A |   | 3/1987 | Kusuda et al. |

(List continued on next page.)

FOREIGN PATENT DOCUMENTS

| DE | 36 32 696 | 4/1988 |
| DE | 42 43 035 | 6/1994 |
| DE | 44 17 238 | 9/1994 |
| DE | 197 31 926 | 1/1999 |
| DE | 198 34 541 | 2/2000 |
| EP | 1 108 122 | 6/2001 |
| EP | 1262644 | 12/2002 |
| GB | 2381218 | 4/2003 |
| GB | 2383548 | 7/2003 |
| WO | 97/36676 | 10/1997 |

OTHER PUBLICATIONS

WPI Abstract AN 1998–1604070 [15] & JP 10030431 A (Meidensha).

*Primary Examiner*—Thomas Denion
*Assistant Examiner*—Diem Tran
(74) *Attorney, Agent, or Firm*—Andrus, Sceales, Starke & Sawall, LLP

(57) ABSTRACT

An exhaust aftertreatment device (10) includes an aftertreatment element (24) for treating internal combustion engine exhaust, an injector (26) for injecting chemical species mixing with the exhaust prior to reaching the aftertreatment element, and a turbulator (36) turbulating the exhaust to enhance the noted mixing. In a desired combination, a two-stage integrated perforated tube combination structure includes a turbulent mixing tube (38) disposed in an acoustic tube (40) and concentrically surrounded thereby.

16 Claims, 1 Drawing Sheet

U.S. PATENT DOCUMENTS

| | | | |
|---|---|---|---|
| 4,672,808 A | * | 6/1987 | Leonhard et al. .............. 60/286 |
| 4,730,454 A | | 3/1988 | Pischinger et al. |
| 4,732,743 A | | 3/1988 | Schmidt et al. |
| 4,854,123 A | | 8/1989 | Inoue |
| 4,866,932 A | | 9/1989 | Morita et al. |
| 4,902,309 A | | 2/1990 | Hempenstall |
| 5,015,171 A | * | 5/1991 | Zinn et al. ...................... 431/1 |
| 5,021,227 A | | 6/1991 | Kobayachi et al. |
| 5,053,062 A | | 10/1991 | Barris et al. |
| 5,063,737 A | * | 11/1991 | Lopez-Crevillen et al. ... 55/484 |
| 5,082,478 A | | 1/1992 | Oono et al. |
| 5,171,341 A | | 12/1992 | Merry |
| 5,209,062 A | | 5/1993 | Vollenweider |
| 5,322,537 A | | 6/1994 | Nakamura et al. |
| 5,339,630 A | | 8/1994 | Pettit |
| 5,417,059 A | * | 5/1995 | Hartel et al. .................. 60/276 |
| 5,453,116 A | | 9/1995 | Fischer et al. |
| 5,457,945 A | | 10/1995 | Adiletta |
| 5,584,178 A | | 12/1996 | Naegeli et al. |
| 5,611,832 A | | 3/1997 | Suzuki et al. |
| 5,643,536 A | | 7/1997 | Schmelz |
| 5,720,787 A | | 2/1998 | Kasai et al. |
| 5,771,689 A | | 6/1998 | Bareis et al. |
| 5,802,844 A | * | 9/1998 | Lee et al. ...................... 60/274 |
| 5,829,248 A | * | 11/1998 | Clifton ........................ 60/286 |
| 5,908,480 A | | 6/1999 | Ban et al. |
| 5,992,141 A | | 11/1999 | Berriman et al. |
| 6,003,305 A | | 12/1999 | Martin et al. |
| 6,041,594 A | | 3/2000 | Brenner et al. |
| 6,050,088 A | | 4/2000 | Brenner |
| 6,401,449 B1 | * | 6/2002 | Hofmann et al. .............. 60/274 |
| 6,401,455 B1 | * | 6/2002 | Mathes et al. ................. 60/286 |
| 6,442,933 B2 | * | 9/2002 | Rusch ......................... 60/286 |
| 2002/0040826 A1 | | 4/2002 | Wagner et al. |

* cited by examiner

EXHAUST AFTERTREATMENT DEVICE, INCLUDING CHEMICAL MIXING AND ACOUSTIC EFFECTS

CROSS-REFERENCE TO RELATED APPLICATION

This application is a Continuation-in-part of U.S. patent application Ser. No. 09/981,171, filed Oct. 17, 2001, incorporated herein by reference.

BACKGROUND AND SUMMARY OF THE INVENTION

The invention relates to aftertreatment devices for internal combustion engine exhaust, and more particularly to combined chemical mixing and acoustic effects.

To address engine emission concerns, new standards continue to be proposed for substantial reduction of various emissions, including $NO_X$ and particulate emissions. Increasingly stringent standards will require installation of aftertreatment devices in engine exhaust systems. Some of the aftertreatment technologies require certain chemical species to be injected into the exhaust system. For example, HC or fuel is injected in some active lean $NO_X$ systems, and additives such as cerium and iron are injected for diesel particulate filter regeneration, and urea solution is injected in selective catalytic reduction (SCR) systems for $NO_X$ reduction. These injected chemical species need to be well mixed with exhaust gas before reaching catalysts or filters for the systems to perform properly.

Perforated tubes are widely used in engine exhaust systems for noise reduction. If designed properly, perforated tubes can also create high intensity turbulent flow. The turbulent flow will promote turbulent diffusion of the chemical species and therefor enhance the mixing process.

In one aspect of the present invention, improved chemical mixing is provided.

In another aspect, the invention integrates a turbulent mixing tube with an acoustic tube into an engine exhaust system.

In another aspect, the invention provides an engine exhaust system with two-stage perforated tubes. The system is designed not only to reduce the noise level, but also to enhance the mixing processes of chemical species which are injected into the exhaust system, including for regeneration of diesel particulate filters and for controlling engine $NO_X$ emissions.

DETAILED DESCRIPTION OF THE INVENTION

Figures 1, 2, 3:
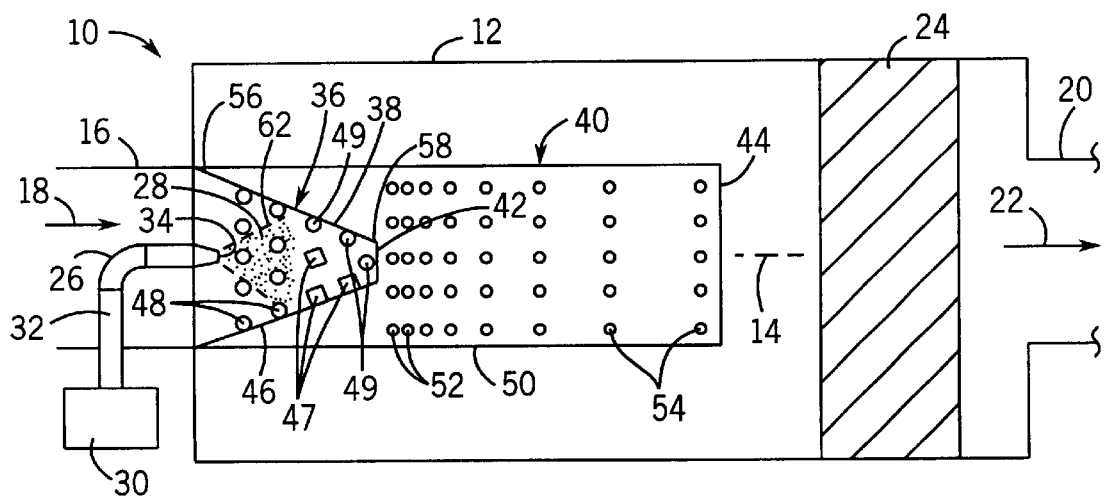
FIG. 1 is a side schematic sectional view of an exhaust aftertreatment device in accordance with the invention.
FIG. 2 is like a portion of FIG. 1 and shows another embodiment.
FIG. 3 is like a portion of FIG. 1 and shows another embodiment.

FIG. 1 shows an exhaust aftertreatment device 10 including a housing 12 extending axially along an axis 14, and having an upstream inlet 16 for receiving engine exhaust as shown at arrow 18, and having a downstream outlet 20 for discharging the exhaust as shown at arrow 22. An aftertreatment element 24, for example an SCR catalyst and/or an oxidation catalyst and/or a particulate filter, is provided in the housing for treating the exhaust. An injector 26 is provided in the housing for injecting chemical species as shown at 28 mixing with the exhaust prior to reaching aftertreatment element 24. For example, in one embodiment, aqueous urea solution is injected from reservoir or tank 30 through tubular conduit 32 and is injected at nozzle or tip 34, though other chemical species may be used.

A turbulator 36 is provided in the housing upstream of aftertreatment element 24 and turbulating the exhaust to enhance the noted chemical mixing upstream of aftertreatment element 24. The turbulator is provided by a perforated mixing tube 38. Also provided in the housing is a perforated acoustic tube 40 quieting the exhaust.

It has been found that improved performance results from providing the tubes 36 and 40 with different perforation hole sizes, namely by providing the mixing tube 36 with larger perforation hole sizes than acoustic tube 40. In a particular situation, it has been found that improved performance results when mixing tube 36 has a perforation hole size greater than or equal to one-quarter inch, and when acoustic tube 40 has a perforation hole size less than one-quarter inch, preferably less than or equal to one-eighth inch. It has been found that the noted perforation hole size greater than or equal to one-quarter inch for mixing tube 36 creates improved turbulent diffusion and mixing of the injected chemical species, and that the noted perforation hole size less than one-quarter inch for acoustic tube 40 minimizes aeroacoustic effects. In preferred form, perforation holes 48 of turbulator 36 are square shaped as shown at 47 for generating homogenous and isotropic turbulence, though circular holes are also acceptable as optionally shown at 49. Perforation holes 52 and 54 of acoustic tube are preferably circular.

In the preferred embodiment, mixing tube 36 is conical, preferably frustoconical with a closed nonperforated downstream end 42. Further in the preferred embodiment, acoustic tube 40 is cylindrical, with a closed nonperforated downstream end 44. Conical mixing tube 38 has a tapered sidewall 46 with uniform porosity as shown at perforations 48. Cylindrical acoustic tube 40 has a sidewall 50 with varied porosity, for example as shown at upstream perforations 52 having a higher density than downstream perforations 54. The varied porosity along a cylindrical sidewall has been found to provide a more even flow therealong. Porosity may also be varied by varying the size, distance, and number of perforation holes. Mixing tube 38 is disposed in acoustic tube 40 and concentrically surrounded thereby. Each of tubes 38 and 40 is upstream of aftertreatment element 24. In preferred form, mixing tube 38 is upstream of acoustic tube 40, and mixing tube 38 is within acoustic tube 40.

Mixing tube 38 has an upstream end 56 and a downstream end 58, and the noted perforated sidewall 46 extending therebetween. Sidewall 46 is perforated at perforations 48 with a porosity selected to provide substantially uniform resistance and even flow along mixing tube 38. In preferred form, the noted substantially uniform resistance and even flow is provided in combination by a conically tapered sidewall 46 perforated with uniform porosity. The conical shape points downstream such that mixing tube 38 narrows to smaller cross-sectional areas as mixing tube 36 extends from upstream end 56 to downstream end 58. As above noted, the conical shape is truncated at 42 at downstream end 58.

FIG. 2 uses like reference numerals from above where appropriate to facilitate understanding. In FIG. 2, a screen 60 extends from injector 26 at nozzle or tip 34 and is disposed in mixing tube 38. Injector 26 at nozzle 34 injects the chemical species along a spray pattern as shown at 28, FIG. 1, having an injection boundary 62. Screen 60, FIG. 2, extends from the injector along injection boundary 62. As above noted, mixing tube 38 has a conical shape pointing downstream. Screen 60 has a conical shape pointing upstream, namely to an apex or truncated apex at injector tip or nozzle 34. Conical mixing tube 38 at its tapered sidewall 46 convergingly tapers as it extends downstream. Screen 62 divergingly tapers as it extends downstream.

FIG. 3 uses like reference numerals from above where appropriate to facilitate understanding. In FIG. 3, conical screen 60 of FIG. 2 is replaced by a spherical screen 64 around injector tip 34 and extending therefrom.

As is known, the injected chemical species undergoes chemical processes in mixing with the exhaust, including chemical decomposition, chemical reaction, and phase change. In a further embodiment, injector 26 is heated by a heat source in addition to heating by the exhaust. In one embodiment, the heat source is provided by a voltage source 70 external of the housing and a pair of electrical conductors 72, 74 connecting the voltage source to the injector. Heater 70 is provided for heating the injector and accelerating the noted chemical processes.

Also as known, the injected chemical species is subject to coagulation and coalescence. In a further embodiment, a screen such as 60 or 64 is provided, extending from the injector, and a heater is provided for heating the screen to minimize the noted coagulation and coalescence. In one embodiment, such heat source is provided by the same voltage source 70 noted above, and a pair of electrical conductors 76, 78 connecting the voltage source to screen 60 or 64.

It is recognized that various equivalents, alternatives, and modifications are possible within the scope of the appended claims.

What is claimed is:

1. An exhaust aftertreatment device comprising:
    a housing extending along an axis and having an upstream inlet for receiving said exhaust, and a downstream outlet for discharging said exhaust;
    an aftertreatment element in said housing for treating said exhaust;
    an injector in said housing upstream of said aftertreatment element and injecting chemical species mixing with said exhaust prior to reaching said aftertreatment element;
    a turbulator in said housing upstream of said aftertreatment element and turbulating said exhaust to enhance said mixing upstream of said aftertreatment element, wherein said turbulator comprises a perforated mixing tube having an upstream side facing said injector, and a downstream side facing said aftertreatment element, and wherein said perforated mixing tube has a plurality of perforation holes extending therethrough from said upstream side to said downstream side, and wherein exhaust passes through said perforation holes from said upstream side to said downstream side, wherein said perforated mixing tube has square perforation holes.

2. An exhaust aftertreatment device comprising:
    a housing extending along an axis and having an upstream inlet for receiving said exhaust, and a downstream outlet for discharging said exhaust;
    an aftertreatment element in said housing for treating said exhaust;
    an injector in said housing upstream of said aftertreatment element and injecting chemical species mixing with said exhaust prior to reaching said aftertreatment element;
    a turbulator in said housing upstream of said aftertreatment element and turbulating said exhaust to enhance said mixing upstream of said aftertreatment element, wherein, said injector injects said chemical species along a spray pattern having an injection boundary, and comprising a screen extending from said injector along said injection boundary, and said turbulator comprises a mixing tube having a conical shape pointing downstream, and said screen has a conical shape pointing upstream.

3. The exhaust aftertreatment device according to claim 2 wherein said mixing tube convergingly tapers as it extends downstream, and said screen divergingly tapers as it extends downstream.

4. An exhaust aftertreatment device comprising:
    a housing extending along an axis and having an upstream inlet for receiving said exhaust, and a downstream outlet for discharging said exhaust;
    an aftertreatment element in said housing for treating said exhaust;
    an injector in said housing upstream of said aftertreatment element and injecting chemical species mixing with said exhaust prior to reaching said aftertreatment element;
    a turbulator in said housing upstream of said aftertreatment element and turbulating said exhaust to enhance said mixing upstream of said aftertreatment element, wherein said turbulator comprises a perforated mixing tube having an upstream side facing said injector, and a downstream side facing said aftertreatment element, and wherein said perforated mixing tube has a plurality of perforation holes extending therethrough from said upstream side to said downstream side, and wherein exhaust passes through said perforation holes from said upstream side to said downstream side, and comprising a spherical screen around said injector and extending therefrom.

5. An exhaust device comprising:
    a housing extending along an axis and having an upstream inlet for receiving said exhaust, and a downstream outlet for discharging said exhaust;
    an injector in said housing for injecting chemical species mixing with said exhaust;
    a turbulent mixing tube in said housing turbulating said exhaust and enhancing said mixing, said mixing tube having an upstream side and a downstream side and a plurality of perforation holes extending therethrough from said upstream side to said downstream side, wherein exhaust passes through said perforation holes from said upstream side to said downstream side;
    an acoustic tube in said housing quieting said exhaust, said acoustic tube having an upstream side and a downstream side and a plurality of perforation holes extending therethrough from said upstream side to said downstream side, and wherein exhaust passes through said perforation holes of said acoustic tube from its upstream side to its downstream side, and wherein exhaust passes serially through said perforation holes of said mixing tube and said perforation holes of said acoustic tube.

6. The exhaust device according to claim 5 wherein said exhaust passes firstly through said perforation holes of said mixing tube and then through said perforation holes of said acoustic tube.

7. The exhaust device according to claim 5 wherein one of said tubes has a different perforation hole size than the other of said tubes.

8. The exhaust device according to claim 7 wherein said mixing tube has a larger perforation hole size than said acoustic tube.

9. The exhaust device according to claim 8 wherein said mixing tube has a perforation hole size greater than or equal to one-quarter inch to create turbulent diffusion and mixing of said injected chemical species, and wherein said acoustic tube has a perforation hole size less than one-quarter inch to minimize aeroacoustic effects.

10. The exhaust device according to claim 5 wherein said turbulent mixing tube is perforated with square perforation holes and in combination said acoustic tube is perforated with circular perforation holes.

11. The exhaust device according to claim 5 wherein said mixing tube is conical and in combination said acoustic tube is cylindrical.

12. The exhaust device according to claim 11 wherein said conical mixing tube has a tapered sidewall with uniform porosity and in combination said cylindrical acoustic tube has a sidewall with varied porosity.

13. The exhaust device according to claim 12 wherein said mixing tube is disposed in said acoustic tube and concentrically surrounded thereby.

14. The exhaust device according to claim 5 comprising an aftertreatment element in said housing for treating said exhaust, and wherein each of said tubes is upstream of said aftertreatment element.

15. The exhaust device according to claim 14 wherein said mixing tube is upstream of said acoustic tube.

16. The exhaust device according to claim 15 wherein said mixing tube is within said exhaust tube.

* * * * *